(12) United States Patent
Rockefeller et al.

(10) Patent No.: US 9,860,289 B2
(45) Date of Patent: Jan. 2, 2018

(54) MULTIMEDIA DIGITAL CONTENT RETRIEVAL, MATCHING, AND SYNCING SYSTEMS AND METHODS OF USING THE SAME

(71) Applicant: Radeeus, Inc., New York, NY (US)

(72) Inventors: Ryan Rockefeller, New York, NY (US); Matt Rogers, New York, NY (US)

(73) Assignee: Radeeus, Inc., New York, NY (US)

(*) Notice: Subject to any disclaimer, the term of this patent is extended or adjusted under 35 U.S.C. 154(b) by 63 days.

(21) Appl. No.: 14/587,317

(22) Filed: Dec. 31, 2014

(65) Prior Publication Data

US 2015/0341406 A1     Nov. 26, 2015

Related U.S. Application Data

(60) Provisional application No. 62/002,260, filed on May 23, 2014.

(51) Int. Cl.
| | | |
|---|---|---|
| *G06F 15/16* | (2006.01) | |
| *H04L 29/06* | (2006.01) | |
| *H04L 29/08* | (2006.01) | |

(52) U.S. Cl.
CPC ........ *H04L 65/4084* (2013.01); *H04L 65/403* (2013.01); *H04L 67/10* (2013.01); *H04L 67/16* (2013.01)

(58) Field of Classification Search
CPC ... H04L 65/4084; H04L 65/403; H04L 67/10; H04L 67/16
USPC .......................................................... 709/219
See application file for complete search history.

(56) References Cited

U.S. PATENT DOCUMENTS

| | | | | |
|---|---|---|---|---|
| 7,194,563 B2* | 3/2007 | Plourde, Jr. | ....... | G06F 17/30017 348/E5.007 |
| 7,603,683 B2* | 10/2009 | Reto | ................. | H04L 29/06027 709/204 |
| 7,657,224 B2 | 2/2010 | Goldberg et al. | | |
| 7,865,537 B2 | 1/2011 | Kodama et al. | | |
| 7,865,571 B2* | 1/2011 | Ho | ...................... | H04L 65/4084 455/552.1 |
| 8,478,719 B2 | 7/2013 | Savenok | | |
| 8,521,316 B2 | 8/2013 | Louboutin | | |
| 8,589,171 B2 | 11/2013 | Savenok | | |
| 8,667,075 B1 | 3/2014 | King | | |
| 8,675,273 B2* | 3/2014 | Yang | ...................... | G02B 5/201 359/290 |
| 8,688,631 B2 | 4/2014 | Savenok | | |
| 8,769,031 B1 | 7/2014 | Lee | | |
| 9,094,362 B2 | 7/2015 | Lee | | |

(Continued)

OTHER PUBLICATIONS

International Search Report and Written Opinion of the International Searching Authority, PCT Pat. App. No. PCT/US2015/032032 dated Feb. 11, 2016.

*Primary Examiner* — SM Rahman
(74) *Attorney, Agent, or Firm* — Scherrer Patent & Trademark Law, P.C.; Stephen T. Scherrer; Monique A. Morneault

(57) ABSTRACT

The present invention relates to a multimedia digital content retrieval, matching, and syncing systems and methods of using the same. Specifically, the present systems and methods provide a peer-to-peer live digital portal that lets users share the experience of multimedia content from multiple multimedia services in real-time.

16 Claims, 10 Drawing Sheets

(56) References Cited

U.S. PATENT DOCUMENTS

| | | |
|---|---|---|
| 9,438,553 B2 | 9/2016 | Lee |
| 9,549,024 B2 | 1/2017 | Leekley |
| 2006/0059560 A1 | 3/2006 | Montulli |
| 2006/0080103 A1 | 4/2006 | Van Breemen |
| 2009/0170472 A1* | 7/2009 | Chapin ................ H04W 28/18 455/410 |
| 2010/0299391 A1 | 11/2010 | Demarta et al. |
| 2012/0082424 A1 | 4/2012 | Hubner et al. |
| 2012/0233120 A1 | 9/2012 | Nijim et al. |
| 2012/0271908 A1* | 10/2012 | Luna .................... G06F 9/5016 709/216 |
| 2013/0073400 A1* | 3/2013 | Heath .................... G06Q 30/02 705/14.73 |
| 2013/0198633 A1 | 8/2013 | Hyman |
| 2013/0332526 A1 | 12/2013 | Hurley et al. |
| 2014/0156800 A1* | 6/2014 | Falvo ................ H04N 21/8456 709/219 |
| 2015/0095931 A1 | 4/2015 | Duong et al. |
| 2015/0350281 A1 | 12/2015 | Bacon |
| 2015/0358691 A1 | 12/2015 | Eun et al. |
| 2016/0021085 A1 | 1/2016 | Lang et al. |
| 2016/0173557 A1 | 6/2016 | Lee |
| 2017/0017665 A1 | 1/2017 | Savenok |
| 2017/0124664 A1 | 5/2017 | Savenok |

\* cited by examiner

MULTIMEDIA DIGITAL CONTENT RETRIEVAL, MATCHING, AND SYNCING SYSTEMS AND METHODS OF USING THE SAME

The present invention claims priority to U.S. Provisional Patent App. No. 62/002,260, entitled, "Streaming Multimedia Sharing System and Methods of Using the Same," filed May 23, 2014, which is incorporated herein by reference in its entirety.

TECHNICAL FIELD

The present invention relates to multimedia digital content retrieval, matching, and syncing systems and methods of using the same. Specifically, the present systems and methods provide a digital portal that allows users to have a peer-to-peer experience through which they share in real-time their personal experience of multimedia that is streaming from multiple multimedia services, thereby enabling other users to sync up with and stay connected to the shared live streaming experience of any individual user or peer.

BACKGROUND

Music as a communal experience goes back hundreds if not thousands of years. Prior to the modern age, sharing the experience of "audio" or "visual" data included public performances of music or staged shows. In the modern age, the desire to share audio or visual data experiences is no different, but the means of providing these types of multimedia content have changed dramatically.

Since Thomas Edison first recorded his voice on a wax cylinder, humankind has recorded itself, both audibly and, although later it time, via video. These recordings have been, more or less, easily reproducible, and thus, use of recorded audio and/or video has proliferated.

Moreover, live broadcast of audio and/or video has been done for many decades via broadcast via radio waves. Indeed, radio and television broadcasts are still immensely popular and lucrative. As technology has advanced, the ability to experience audio and/or video in new ways has increased dramatically. Fast forward to the Internet age, and people are accessing audio, video and other multimedia in almost every corner of the globe over the Internet.

For music, video and other multimedia to be experienced over the Internet, it typically requires specialized equipment, high powered computers, and the like to transform the multimedia into a digital streaming file. It is difficult to stream live, in real time, audio, video or other like multimedia streams and it's even more difficult for people to access this multimedia together in real time. The problem of a real-time synced shared experience is compounded when multimedia is being accessed by different users from different sources. A need, therefore, exists for multimedia retrieval, matching and syncing systems and methods of using the same that allows a user to share in real-time the experience of live audio, video and/or other streaming multimedia with others on the Internet in such a way that anyone can sync up with and stay connected to that shared live streaming experience.

While streaming music and other multimedia online is quite popular, there are many sources for obtaining streaming of music and other multimedia. Because of this, the market providing access to streaming multimedia is fragmented. A need, therefore, exists for a multimedia portal that concentrates a social layer on top of a plurality of multimedia digital content streaming services, allowing users to search and access audio, video and other multimedia from their favorite sources in a single location and then allowing other users to sync into and stay connected with the experience by either accessing content from the same source or by matching and streaming the content from another accessible source with an overlapping catalogue of content.

SUMMARY OF THE INVENTION

The present invention relates to multimedia digital content retrieval, matching, and syncing systems and methods. Specifically, the present systems allow a user to match and retrieve multimedia content, such as audio and/or video, from one or more multimedia services that they have access to. Specifically, the present system and method provides a portal that coordinates and syncs user access to digital media in real time.

To this end, in an embodiment of the present invention, a method for simultaneously syncing content from one or more multimedia services by multiple users is provided. The method comprises the steps of providing a first multimedia device, providing a first multimedia service that a first user has access to, wherein the first multimedia service is accessible on the first multimedia device, selecting a first multimedia content from the first multimedia service by the first user on the first multimedia device, creating a first channel on the first multimedia device, wherein the first channel displays information relating to at least the first multimedia content, playing at least the first multimedia content on the first multimedia device, showing a second user what's being accessed by the first user via the first multimedia service on the first channel, wherein the first multimedia content can be accessed by the second multimedia device by independently retrieving the first multimedia content from the first multimedia service or by finding and streaming the first multimedia content from another accessible multimedia service with an overlapping catalogue of multimedia content.

In an embodiment, the method further comprises the steps of recording a time point in the first multimedia content on the first multimedia device when the second user independently accesses the first multimedia content from the first multimedia service, and synchronizing the first multimedia content on the second multimedia device with the time point in the first multimedia content on the first multimedia device.

In an embodiment, the first multimedia content is selected from the group consisting of music, video, audio, live event, and any combination thereof.

In an embodiment, the method further comprises the steps of providing social network functions selected from the group consisting of messaging, commenting, liking, promoting, following, befriending, chatting, audio messaging, video messaging, audio voice-overs, video voice-overs, and any combination thereof.

In an embodiment, the method further comprises the steps of creating a record of what was played by the first user from any multimedia service, wherein the first channel displays the record).

In an embodiment, the method further comprises the step of creating a playlist within the first multimedia service including at least the first multimedia content.

In an embodiment, the method further comprises the steps of providing access to the second user using a second multimedia device, wherein the first multimedia content can be accessed by the second multimedia device either by verifying the second user has access to the first multimedia service and streaming the first multimedia content from the first multimedia service or by verifying the second user has access to the first multimedia content on a second multimedia service with an overlapping catalogue of multimedia content and streaming the first multimedia content from the second multimedia service.

In an embodiment, the method further comprises the steps of selecting a second multimedia content from the first multimedia service by the second user, and creating a second channel on the second multimedia device to display information relating to at least the second multimedia content.

In an embodiment, the method further comprises the steps of providing access to a third user using a third multimedia device, wherein the first multimedia content can be accessed by the third multimedia device either by verifying the third user has access to the first multimedia service and streaming the first multimedia content from the first multimedia service or by verifying the third user has access to the first multimedia content on a second multimedia service with an overlapping catalogue of multimedia content and streaming the first multimedia content from the second multimedia service.

In an alternate embodiment of the present invention, a method for simultaneously syncing content from one or more multimedia sources on multiple multimedia devices amongst multiple users is provided. The method comprises the steps of providing a first multimedia device, providing a first multimedia service that a first user has access to, wherein the first multimedia service is accessible on the first multimedia device, selecting a first multimedia content from the first multimedia service by the first user on the first multimedia device, creating a first channel on the first multimedia device, wherein the first channel displays information relating to at least the first multimedia content, accessing at least the first multimedia content by the first multimedia device, showing a second user what's being accessed by the first user via the first multimedia service on the first channel, wherein the first multimedia content can be accessed by the second multimedia device by independently retrieving the first multimedia content from a second multimedia service that the second user has access to or by finding and streaming the first multimedia content from another accessible multimedia service with an overlapping catalogue of multimedia content that the second user has access to.

In an embodiment, the method further comprises the steps of recording a time point in the first multimedia content on the first multimedia device when the second user independently accesses the first multimedia content from the second multimedia service, and synchronizing the first multimedia content being accessed on the second multimedia device with the time point in the first multimedia content being accessed on the first multimedia device.

In an embodiment, the first multimedia content is selected from the group consisting of music, video, audio, live event, and any combination thereof.

In an embodiment, the method further comprises the steps of providing social network functions selected from the group consisting of messaging, commenting, liking, promoting, following, befriending, chatting, audio messaging, video messaging, audio voice-overs, video voice-overs, and any combination thereof.

In an embodiment, the method further comprises the steps of selecting a second multimedia content by the second user, and creating a second channel on the second multimedia device to display information relating to at least the second multimedia content, wherein the second channel displays information relating to all multimedia content played by the second user including the first multimedia content played by the first user that the second user gained access to and the second multimedia content selected by the second user independent of other users.

Specifically, the second user has an independent channel with a comprehensive list of everything streamed by the second user, regardless of whether the second user has independently selected to stream content or whether the second user has selected to sync up with a first user and stream content selected by that first user.

In an embodiment, the method further comprises the steps of providing access to the second channel to a third user using a third multimedia device, wherein the second multimedia service is accessible on the third multimedia device, verifying that the third user independently has access to the second multimedia content from the second multimedia service, and playing at least the second multimedia content on the third multimedia device.

In an embodiment, the method further comprises the steps of creating a record of what was played by the second multimedia service including at least the first multimedia content, regardless of whether it was independently selected or experienced as a result of synchronized connectivity with the first user on the first user's channel.

In an alternate embodiment of the present invention, a system for simultaneously syncing content amongst multiple users is provided. The system comprises a first multimedia device and a second multimedia device interconnected over a network, a first multimedia service that a first user has access to, wherein the first multimedia service is accessible by the first user on the first multimedia device, a first channel on the first multimedia device accessible over the network by at least a second user using the second multimedia device, wherein the first channel provides information regarding a first multimedia content selected by the first user from the first multimedia service on the first multimedia device, a content verifier that determines whether the second user has independent access to the first multimedia content from the first multimedia service or another accessible multimedia service with an overlapping catalogue of multimedia content when the second user accesses the first channel, and a time synchronizer that initializes the first multimedia content on the second multimedia device at a time point that the first multimedia content is currently being played on the first multimedia device.

In an embodiment, the first multimedia content is selected from the group consisting of music, video, audio, live event, and any combination thereof.

In an embodiment, the content verifier determines whether the second user has access to the first multimedia content through the first multimedia service.

In an embodiment, the content verifier determines whether the second user has access to the first multimedia content through a second multimedia service.

In an embodiment, the system further comprises a second channel on the second multimedia device accessible over the network by at least the first user using the first multimedia device, wherein the second channel provides information regarding a second multimedia content selected by the second user (or experienced as a result of a synchronized connectivity with another user on the other user's channel) from the first multimedia service on the second multimedia device.

In an embodiment, the system further comprises a second channel on the second multimedia device accessible over the network by at least the first user using the first multimedia device, wherein the second channel provides information regarding a second multimedia content selected by the second user (or experienced as a result of a synchronized connectivity with another user on the other user's channel) from a second multimedia service on the second multimedia device.

It is, therefore, an advantage and objective of the present invention to provide multimedia digital content retrieval, content matching, and syncing systems and methods of using the same that allow a user to retrieve live music, audio, video, live events, and/or other multimedia and enable others to retrieve, match, and sync such multimedia content on the Internet.

Moreover, it is an advantage and objective of the present invention to provide a multimedia portal that concentrates a social layer on top of a plurality of multimedia streaming sources, allowing users to search and access audio, video and other multimedia from their favorite sources in a single location.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to a multimedia digital content retrieval, matching, and syncing systems and methods. Specifically, the present system and methods provide a peer-to-peer live digital portal that lets users experience and share the experience of multimedia content from multiple multimedia services in real-time.

The present invention further relates to a peer-to-peer based synchronization of digital content pulled from multiple multimedia services. The content may include, without limitation, music, video, audio, live events, other content known to those skilled in the art, and any combination thereof. In one embodiment, a first user may create a channel accessible by an unlimited number of other users, who can independently retrieve, listen and/or watch in real-time the multimedia content on the first user's channel regardless of the original source.

Figure 1A:
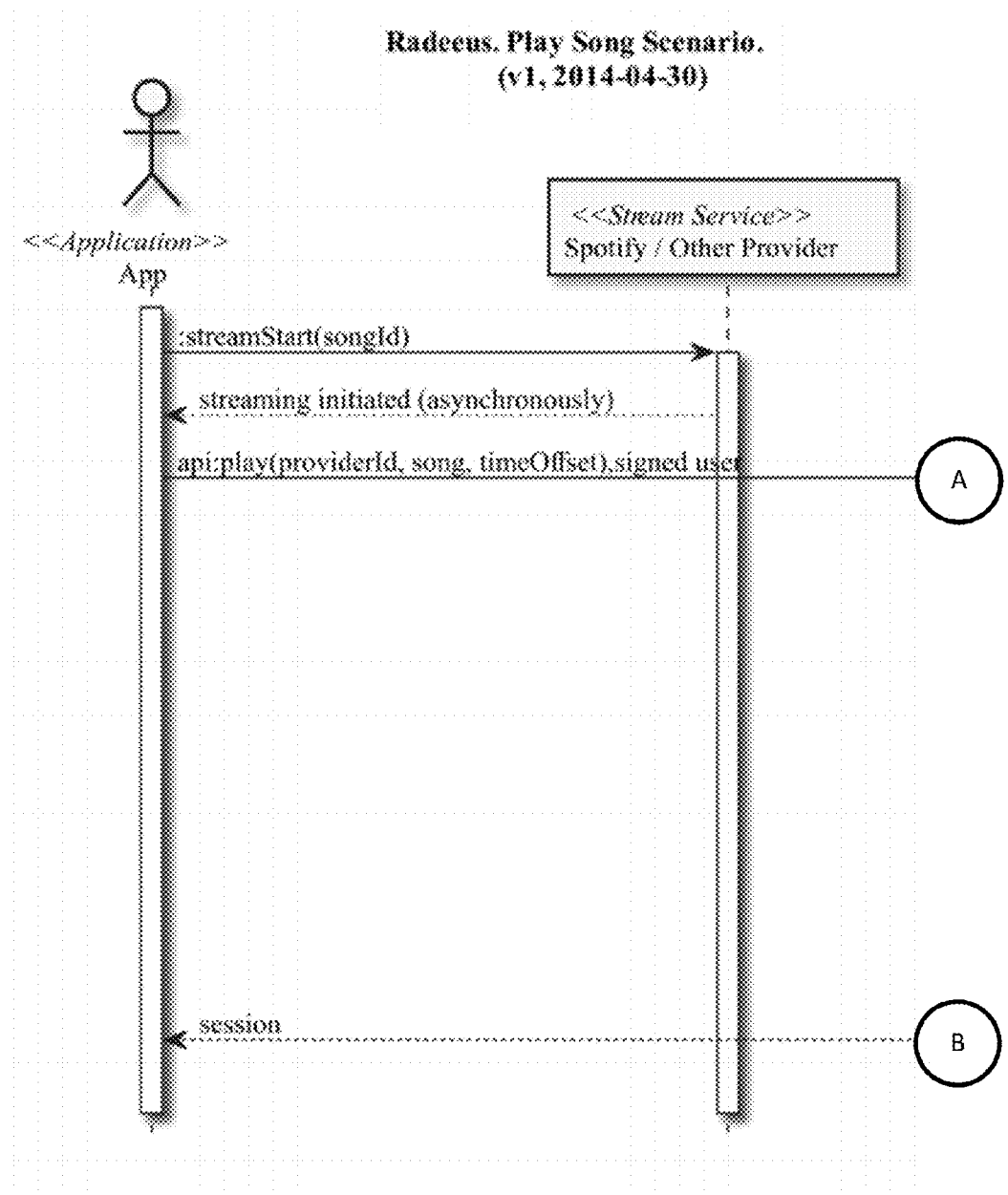
FIGS. 1A-1B illustrate a general flowchart of a user of the systems and methods in an embodiment of the present invention.
Figure 1B:
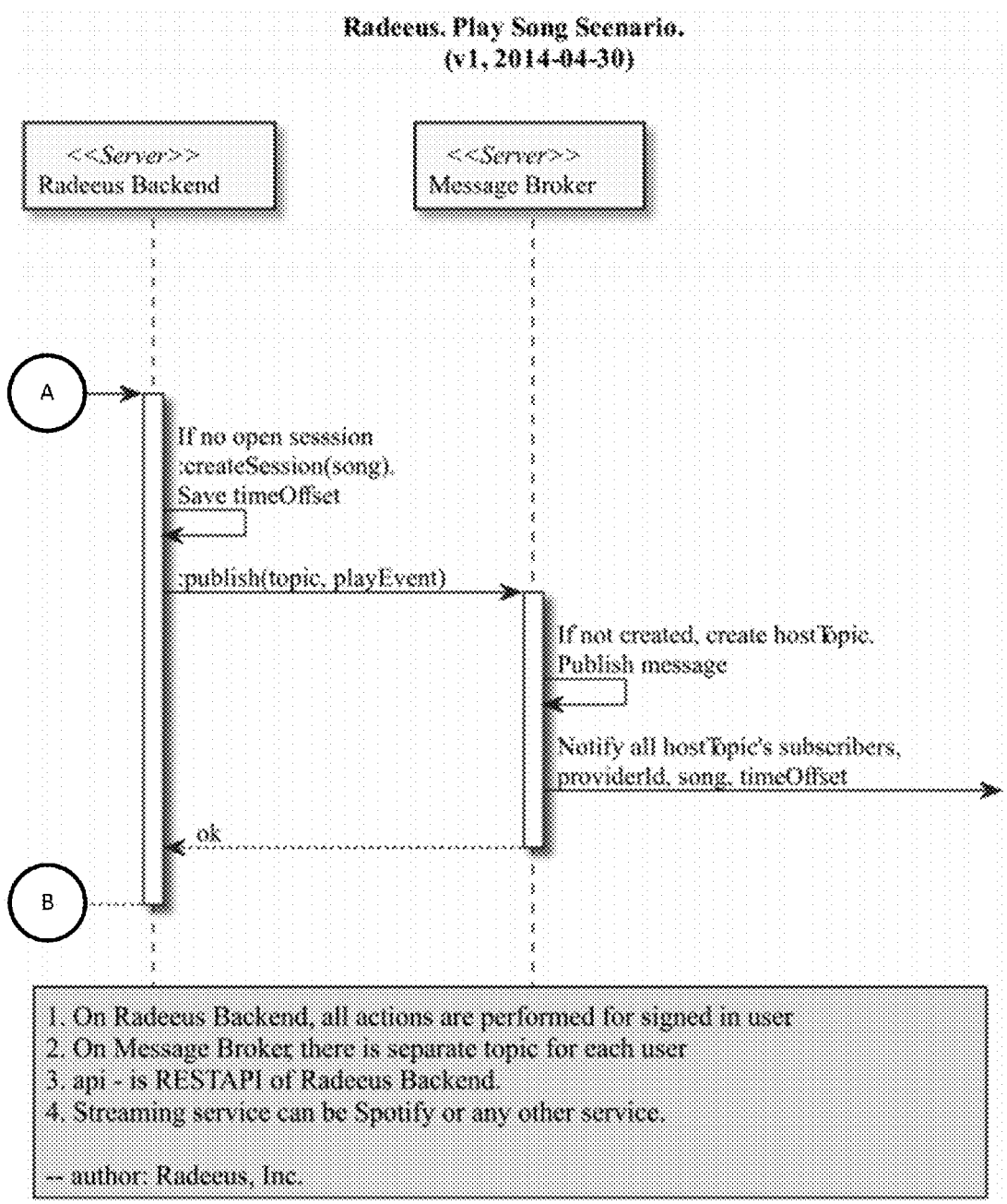

Now referring to the figures, wherein like numerals refer to like parts, FIGS. 1A-1B illustrate an overview of the system and methodology of the present invention. Specifically, a user initiates a session with a streaming multimedia service (SPOTIFY, for example), and accesses the streaming multimedia service through the portal of the present invention ("Radeeus Backend"). The user may then, first, play the multimedia through the portal of the present invention via the streamlining multimedia service and, second, share information regarding the multimedia content being played by the user to others using the portal of the present invention, as illustrated in FIGS. 2A-2B and 3A-3B. For example, at least the name of the multimedia content and a time element at which the user has progressed through the multimedia may be shared with others. A message broker server allows users to communicate with each other during the synchronized experience sharing. For example, the message broker server may allow a user to communicate with others that a particular multimedia content is live. In this manner, the present invention does not actually broadcast or stream the multimedia content from the streaming multimedia service, but allows others to see what multimedia content the user is currently playing through his or her multimedia service, and may provide a shared or communal experience of the multimedia content among the user and others, as further discussed in more detail below.

Figure 2A:
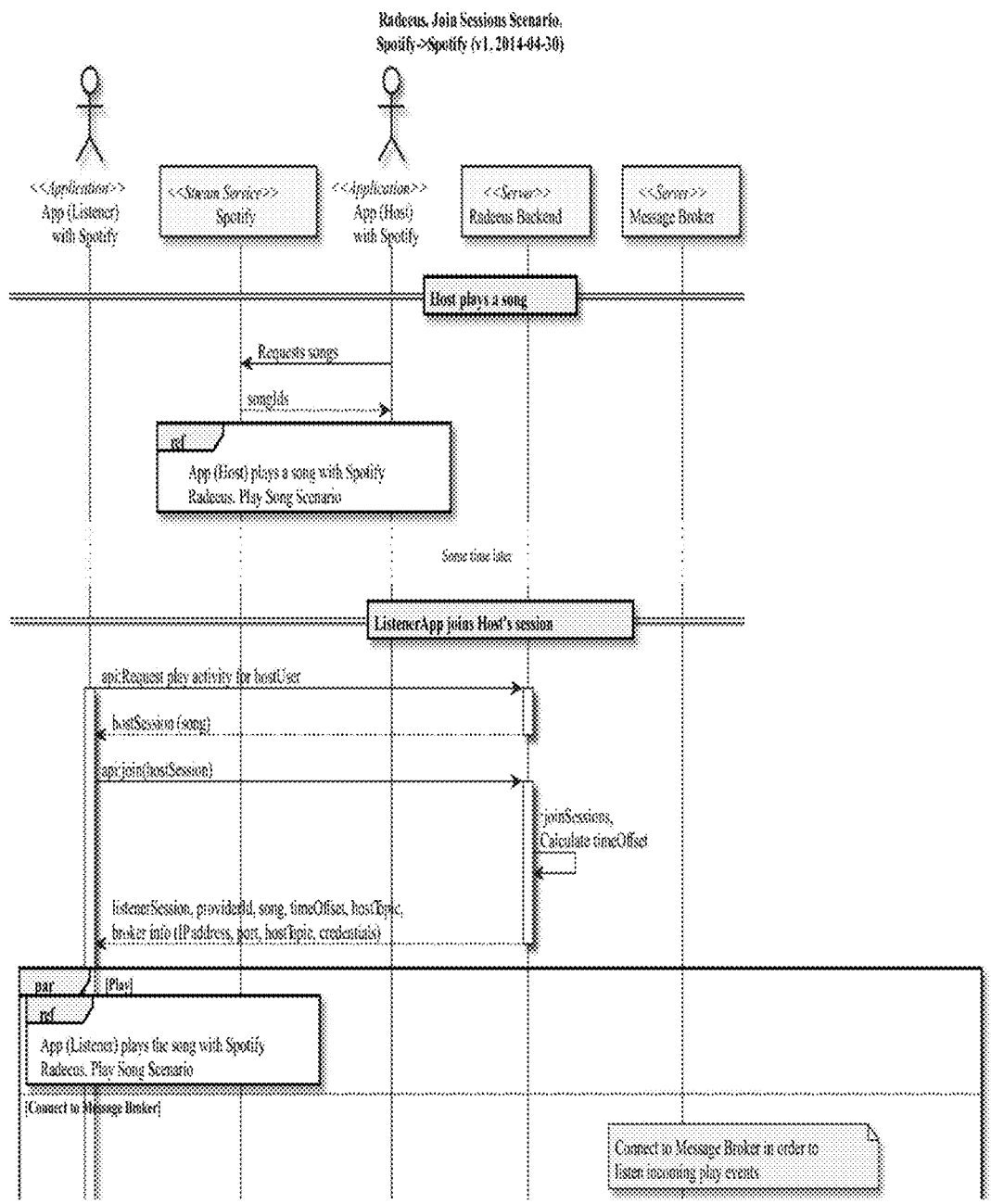
FIGS. 2A-2B illustrate a detailed flowchart of a host user and a listener user in an embodiment of the present invention.
Figure 2B:
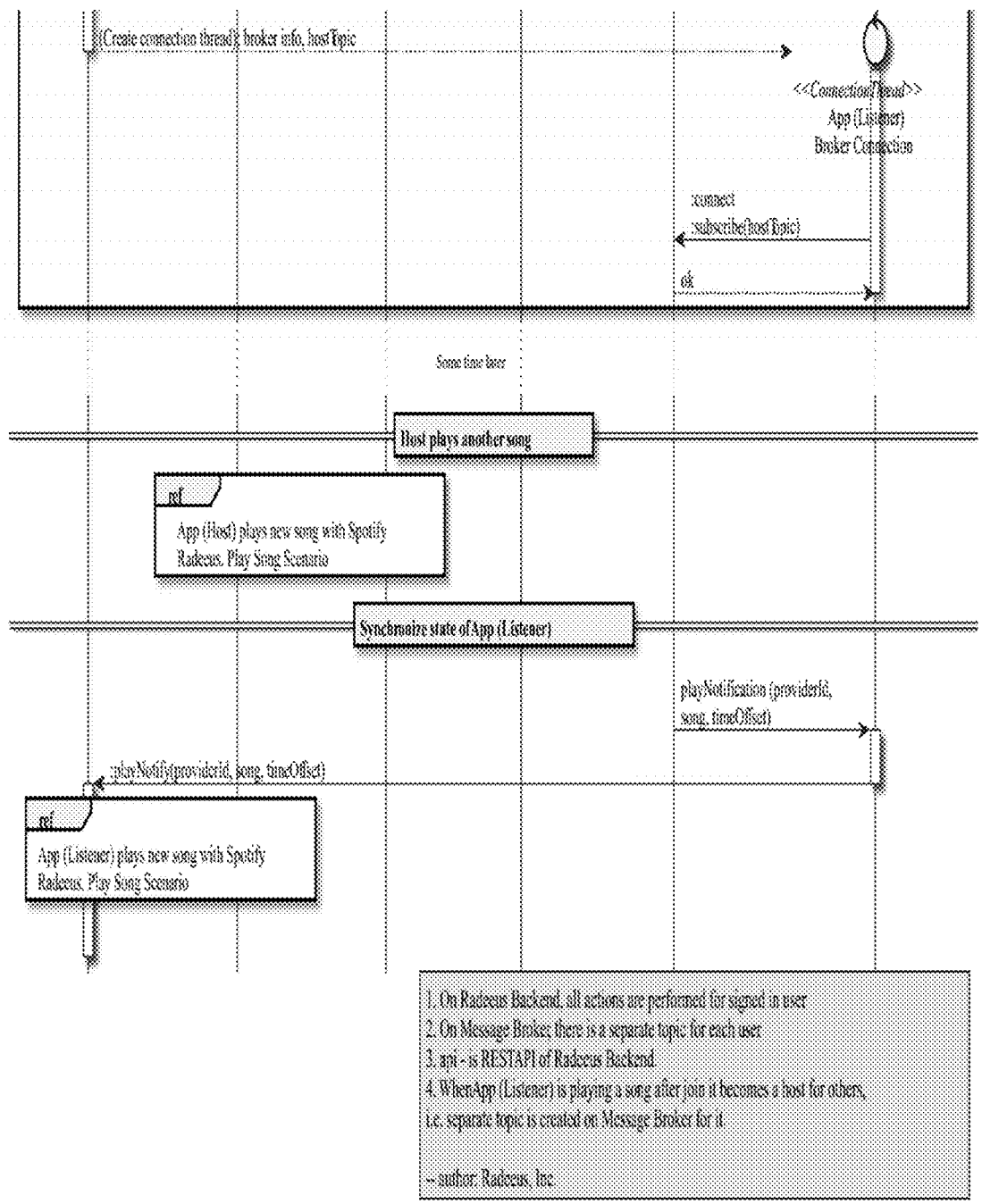

FIGS. 2A-2B illustrate a detailed flowchart of a host user that may access the system, play multimedia from, for example, a streaming multimedia service, and share information regarding the same to listener users, using the system and methods of the present invention. While the present invention describes the multimedia service as a "streaming" multimedia service, it should be noted that any file sharing multimedia service may be utilized, and the present invention should not be limited as described herein. A listener user may utilize the message server to access information about the particular multimedia (such as audio and/or video) being streamed by the host user from the streaming multimedia service. The listener user may then join the host user's session, discussed in further detail below, and experience the same multimedia as the host user at the same point in time in the multimedia as the host user.

Figure 3A:
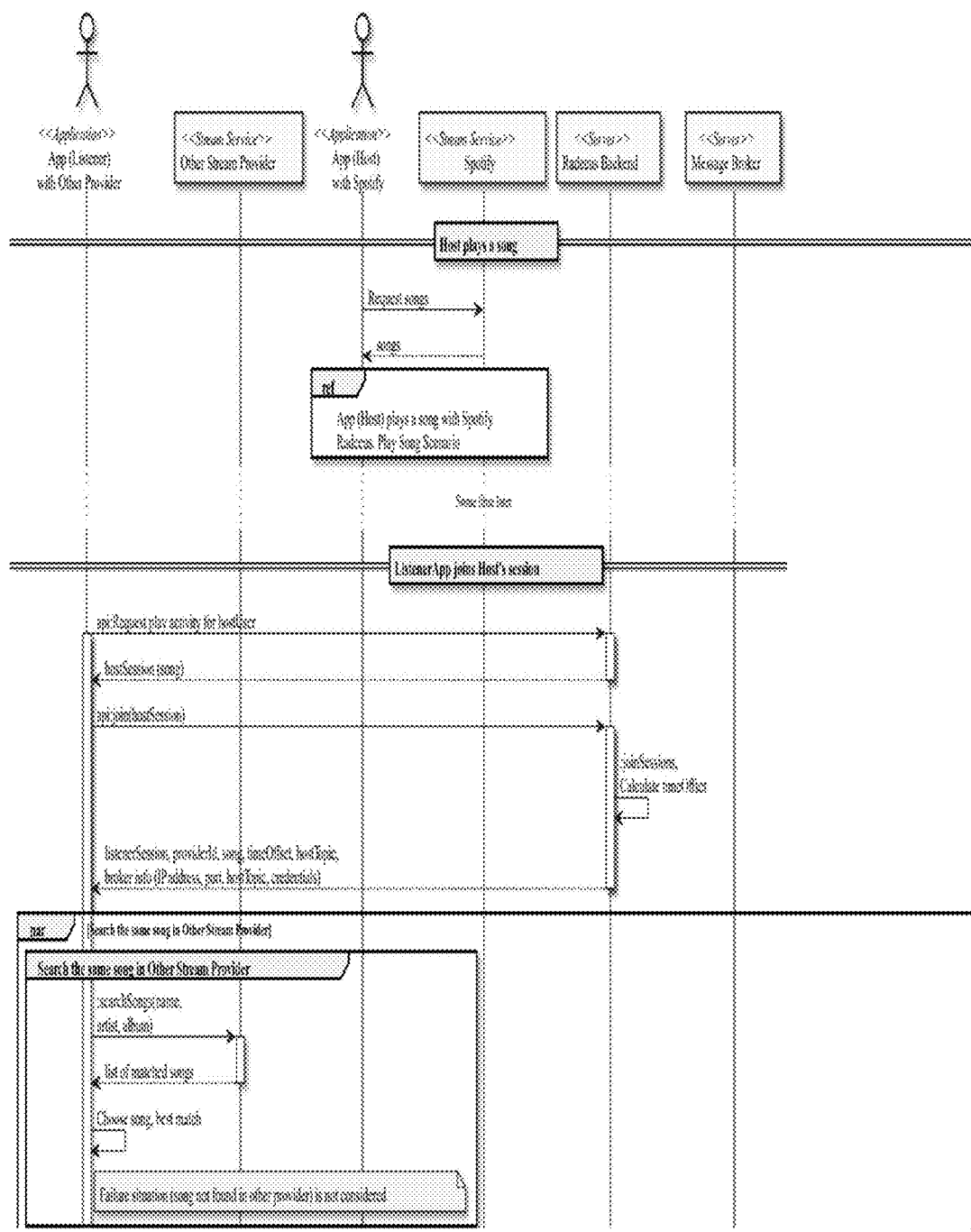
FIGS. 3A-3B illustrate a detailed flowchart of a host user and a listener user utilizing the system of the present invention to match multimedia streamed or otherwise retrieved by a host user in an embodiment of the present invention.
Figure 3B:
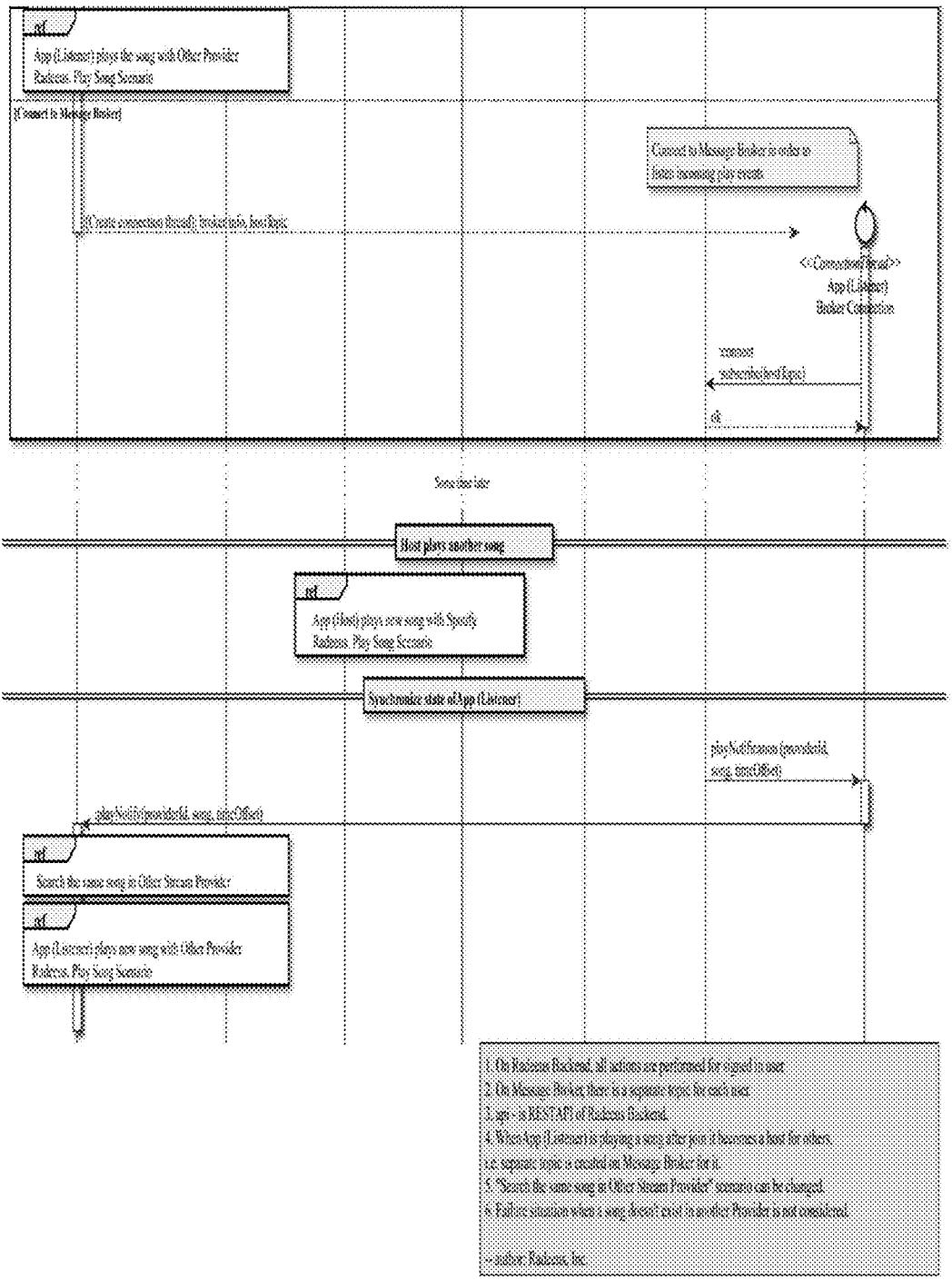

FIGS. 3A-3B illustrate a detailed flowchart of a condition where a listener user receives information concerning multimedia content, and the system of the present invention searches for the multimedia content. Either the system finds the multimedia in one or more multimedia providers, finds a close or closest match of the multimedia content, or fails to find a match for the identified multimedia content.

Figure 4:
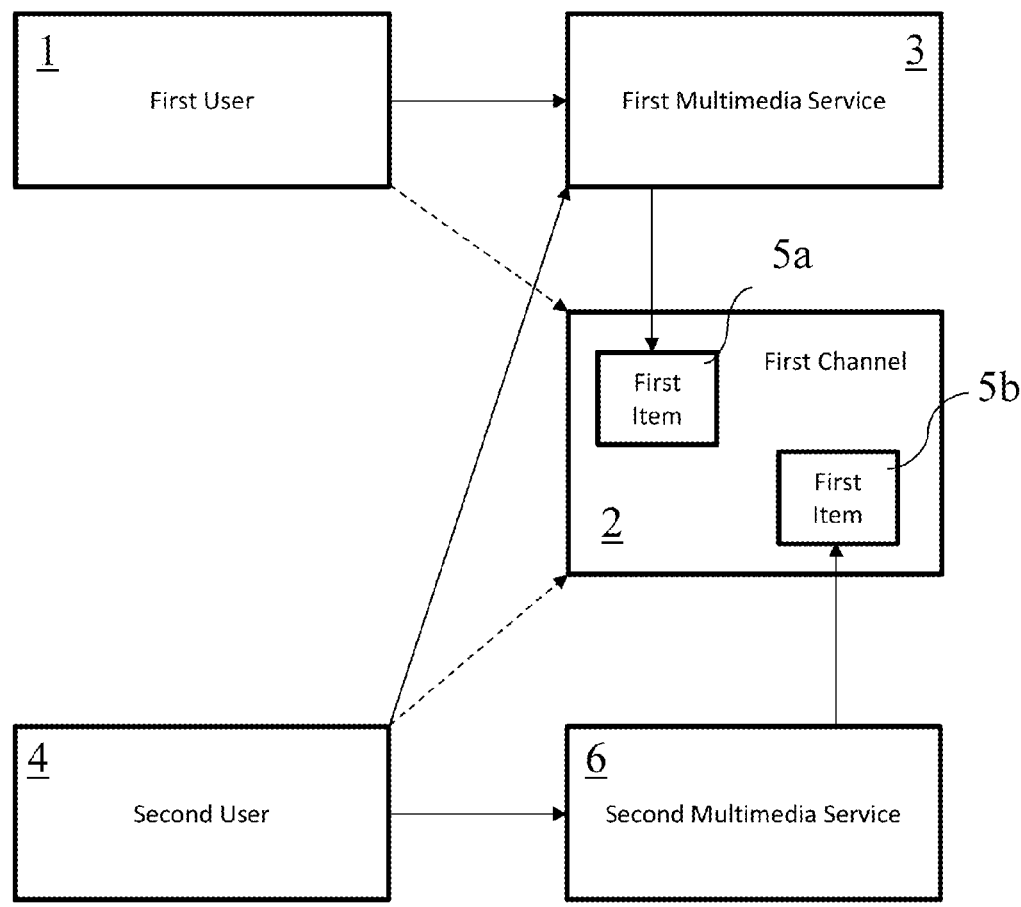
FIG. 4 illustrates a flowchart of a second user connecting to a first multimedia content on a first channel hosted by a first user in a preferred embodiment of the present invention.

FIG. 4 illustrates a preferred embodiment of a system 10 that allows a first user 1 using a first device having a display, a network card, data storage, an audio producing device, and input-output controls to link the first user's content to a plurality of other users. Specifically, the first user 1 may establish a first channel 2 on the system 10. The first channel 2 may be linked to a first multimedia service 3 that the first user has access to or is otherwise subscribed to. A second user 4 using a second device having a display, a network card, data storage, an audio producing device, and input-output controls may request access to the first channel 2 established by the first user 1, or alternatively the first user 1 may propose giving access to the first channel 2 to the second user 4. The first user 1 may choose a first multimedia content 5a from the first multimedia service 3 to stream and subsequently link the first multimedia content 5a with other users through the first channel 2.

In one embodiment, the first multimedia content 5a from the first multimedia service 3 may be a song from a service such as Spotify, for example. Of course, the first multimedia content 5a may be music, video, audio, live events, other multimedia content known to those skilled in the art, and any combination thereof. The first user 1 may be able to search for and/or access all multimedia content through the first multimedia service 3, such as all songs, artists, albums, videos, playlists, and the like available through the first multimedia service 3. Similarly, the first user 1 may be able to sort the multimedia contents by genre, song name, album name, artist name, and other known sorting method known to one skilled in the art.

The system 10 may check if the second user 4 has access or a subscription to the first multimedia service 3. If the second user 4 does not have access or a subscription to the first multimedia service 3, the system 10 may search for an alternate multimedia service that the second user 4 does have access or a subscription to. Where the second user has access or a subscription to a second multimedia service 6, the system 10 may search for a first multimedia content 5b on the second multimedia service 6, the first multimedia content 5b being exactly the same as the first multimedia content 5a except being from an alternate source. If the first multimedia content 5b is found on the second multimedia service 6, the system 10 may connect the second user 4 to the first multimedia content 5b from the second multimedia service 6 through the second user's access or subscription. The system 10 may determine a time point that the first user 1 has progressed to in the first multimedia content 5a from the first multimedia service 3 through the first user's access or subscription, such as a specific time in a song, video, or other like multimedia content. The system 10 may synchronize the first multimedia content 5b from the second multimedia service 6 through the second user's access or subscription to the same time point that the first user has progressed to in the first multimedia content 5a from the first multimedia service 3 through the first user's access or subscription, as shown in FIG. 4.

If the second user 4 does have access or a subscription to the first multimedia service 3, the system 10 may connect the second user 4 to the first multimedia content 5a from the first multimedia service 3 through the second user's access or subscription. The system 10 may determine a time point that the first user 1 has progressed to in the first multimedia content 5a from the first multimedia service 3 through the first user's access or subscription, such as a specific time in a song. The system 10 may synchronize the first multimedia content 5a from the first multimedia service 3 through the second user's access or subscription to the time point that the first user 1 has progressed to in the first multimedia content 5a from the first multimedia service 3 through the first user's access. In other words, the first user 1 and the second user 4 may individually access the first multimedia content 5a from the first multimedia service 3 through each's respective access or subscription and the system 10 may synchronize the first user 1 and the second user 4 in time, such that the first user 1 and the second user 4 are accessing the same point in time in the first multimedia content 5a from the first multimedia service 3 at the same time. Therefore, the first user 1 and the second user 4 may each retrieve the first multimedia content 5a from the first multimedia service 3 individually, instead of the first user 1 broadcasting, streaming, or otherwise reproducing the first user's copy of the first multimedia content 5a. In this way, the first user and the second user are sharing an experience rather than content.

The system 10 may continuously repeat the multimedia content matching and time syncing process described above for a plurality of multimedia contents for a long as the user's wish to remain connected or otherwise synchronized together. Of course, any number of multimedia services may be utilized and any number of users may use the system without departing from the scope of the present invention. Additionally, any user may create a channel and any user may connect to another user's channel.

Once the second user 4 is connected to the first user 1, the second user 4 may add a currently playing multimedia content to a playlist, "like" any multimedia content and display the "like" on a social media website, access the first user's profile, view the first user's multimedia content history, view the first user's multimedia content queue (or list of upcoming multimedia content), befriend the first user 1, message the first user 1, share the first channel 2, promote the first user 1, follow the first user 1, comment on the first user channel 30, chat with the first user 1, send an audio and/or video message, any other alternative social media options known to those skilled in the art, and any combinations thereof. Additionally, the first user 1 and the second user 4 may be able to add audio and/or video voice-overs to overlay the multimedia content on each's respective channel. In an alternative embodiment, the first user 1 and the second user 4 may interact vocally or through video over multimedia content on either's channel to create commentary, critiques, advertisements, and/or general discussions.

In one embodiment, multiple multimedia services may be used by a single user to stream and subsequently link different content through a single channel on the system 10. In one example, a user may be able to create a playlist including a first multimedia content from a first multimedia service and at least a second multimedia content from a second multimedia service. In another example, a user can search for, access, and stream multimedia content from multiple multimedia services and link the multimedia contents to other users through the system 10.

In another embodiment, a third user may obtain access to the first channel established by the first user, and/or may obtain access to a second channel established by the second user. In one embodiment, the third user may access the second channel established by the second user and the second user may access the first channel established by the first user. In this embodiment, the third user may indirectly obtain access to the first channel established by the first user as long as the second user continues accessing the first channel established by the first user. Likewise, if the second user accesses a different channel established by a different user, the third user may indirectly obtain access to the different channel established by the different user as long as the third user continues accessing the second channel established by the second user. In this embodiment, the third user may be considered to be "following" the second user.

Figure 5:
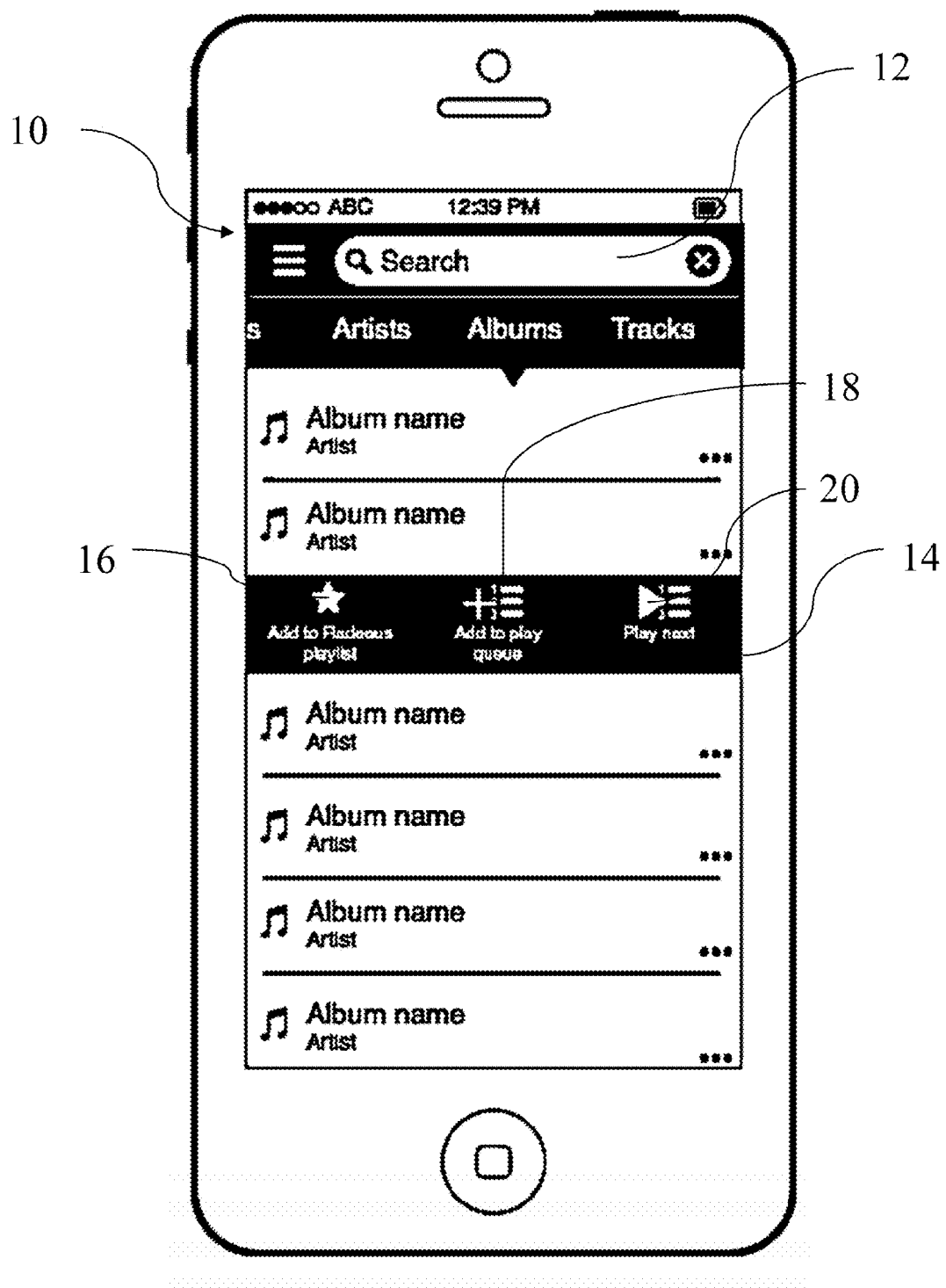
FIG. 5 illustrates a user wireframe for searching and setting up a first user channel in an embodiment of the present invention.

FIG. 5 illustrates a user application wireframe implementation of the system 10. Specifically, FIG. 5 illustrates the process of setting up a user channel. A user may search for artists, albums, tracks, videos, or other media using a search bar 12 on the system 10. The system 10 may provide a list of multimedia contents matching the search criterion typed or otherwise inserted into the search bar 12. As previously discussed, the system 10 may utilize a multimedia service that the user is subscribed to or has access to, in order to populate the search database and ultimately to play a particular multimedia content on a user's device and display information regarding the multimedia content through the user's channel.

The user may be able to select a particular multimedia content from the list of multimedia contents, and a menu 14 may be shown there below, such as through a drop down menu. The menu 14 may have a plurality of selectable options such as an "add to playlist" option 16, an add to play queue option 18, or a play next option 20. The "add to playlist" option 16 may add the information about particular multimedia content to a playlist in the user's multimedia service, which may be a program, application, or system different from the present system 10. The "add to play" queue option 18 and the "play next" option 20 may allow a user to create his or her own channel, as further seen in FIG. 6, and may allow a user to link other users of the system 10 to any multimedia content retrieved from the multimedia service. Specifically, the "add to play" queue option 18 may allow a user to stack information about multiple pieces of multimedia content in a playlist on the system 10. The "play next" option 20 may allow a user to immediately start playing a multimedia content and/or move a multimedia content to the top of the playlist on the system 10.

More specifically, when a user attempts to create a playlist from multimedia content displayed on another user's channel, the playlist may be populated on the user's multimedia service and by the user's multimedia service to the extent the user has his or her own access to such multimedia content. For example, if a first user likes the multimedia played by a second user, the first user may choose to add all the multimedia played by the second user to a playlist to the extent the user has his or her own access to such multimedia content. The playlist may then be created on the first user's multimedia service and the first user's multimedia service may independently access the multimedia that was played by the second user to populate the playlist to the extent the user has his own access to such multimedia content.

Figure 6:
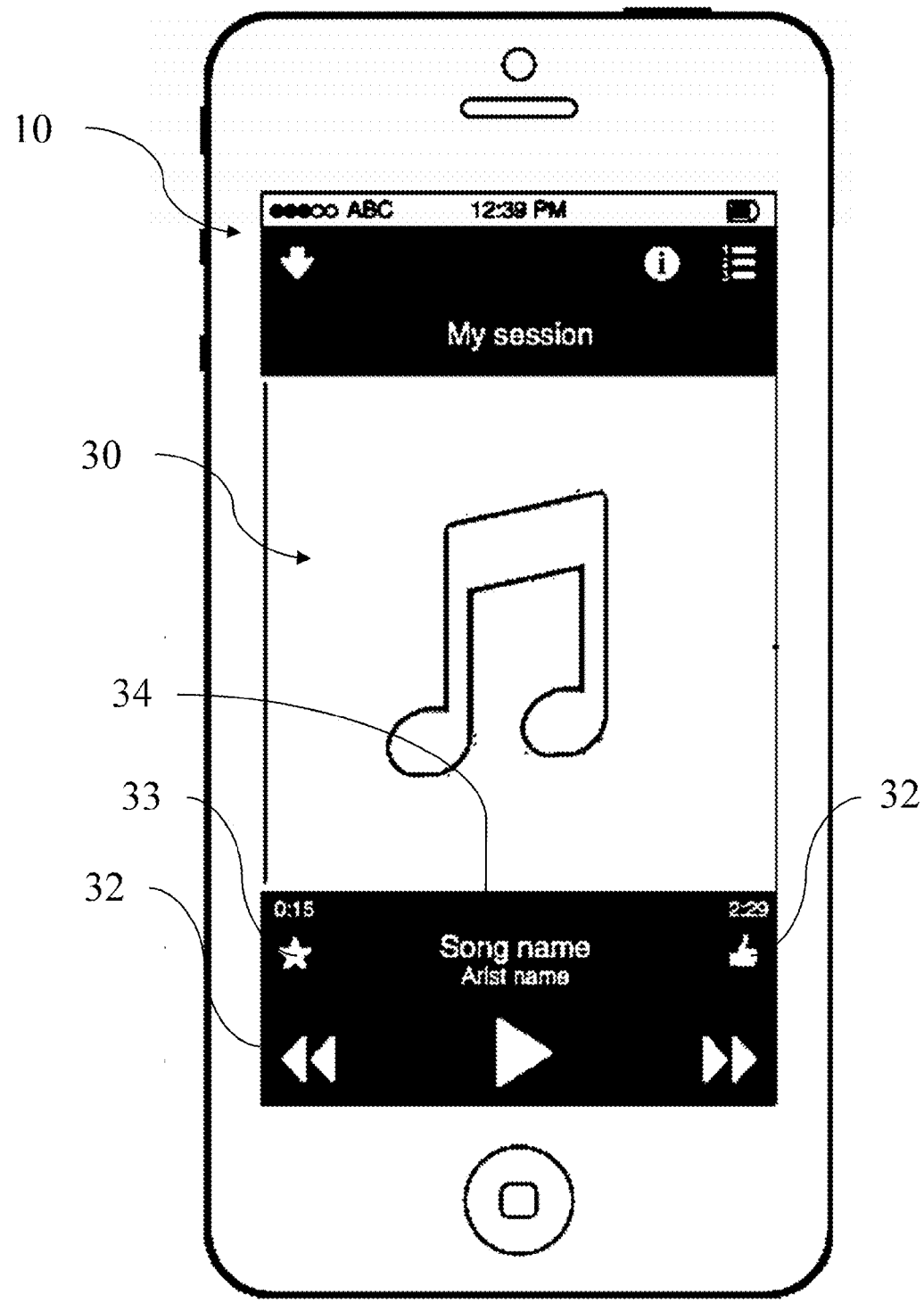
FIG. 6 illustrates a user wireframe displaying the first user channel in an embodiment of the present invention.

FIG. 6 illustrates an example of a first user's channel 30. Of course, the first user's channel 30 may be implemented in alternate ways, and FIG. 6 is shown for exemplary purposes and not by way of limitation. The first user's channel 30 may be used for the first user's personal use, or the first user may preferably invite or allow other users to join, link, or otherwise connect to the first user's channel 30. The first user's channel 30 may provide the first user with a plurality of options 32 such as play, pause, next, backwards, repeat, or other media options known to those skilled in the art. Thus, the first user's channel 30 may provide the first user complete control over the multimedia content, retrieved and played on the first user's device and detailed on the user's channel 30. The first user's channel 30 may display information 34 regarding the multimedia content or multimedia contents selected by the first user. The first user may additionally add the multimedia content to a playlist on the multimedia service he or she subscribes to using a star icon 33 and/or may display that the user likes the multimedia content on his or her social media website using a thumbs up icon 35. In an alternate embodiment of the present invention, the first user's channel 30 may be used to communicate messages between different users.

In one embodiment, the first user's channel 30, and thus any information about multimedia content accessed by the first user's channel 30, may be created and stored on a device operated by the first user and may be stored remotely on a server dedicated to the first user. Specifically, each user may be provided server space to host a channel in a remote location in order to save storage space on the user's device. In an alternate embodiment, the information about the first user's channel 30 may be stored on the first user's device. In this embodiment, each user's device communicates with other user devices, instead of a central server.

Of course, any number of users may have any number of channels and the present disclosure is not meant to be limiting in this manner. Each user's channel, however, may be independent and have a comprehensive list of everything streamed by a first user from his or her multimedia service(s), regardless of whether the first user has independently selected to stream his or her own content from his or her multimedia service(s) or whether the first user has selected to sync up with a second user and stream content selected by the second user, but streamed from the first user's own multimedia service(s).

Figures 7A, 7B:
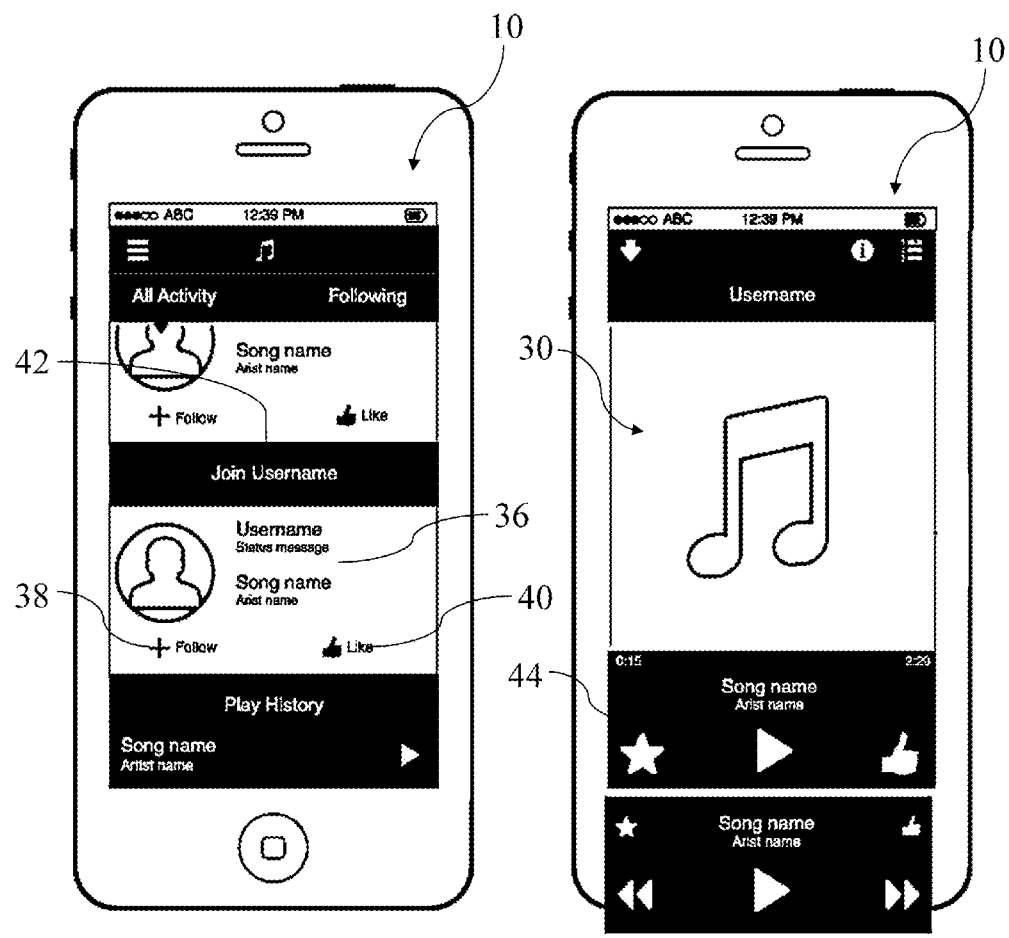
FIG. 7A illustrates a user wireframe for joining a second user channel in an embodiment of the present invention.
FIG. 7B illustrates a user wireframe for viewing a second user channel in an embodiment of the present invention.

FIGS. 7A-7B illustrate a second user's experience in joining the first user's channel 30. The second user may be invited by the first user to the first user's channel 30. Alternately, the second user may browse user channels, locate the first user's channel 30, and request or otherwise obtain access. The system 10 may provide information 36 regarding the first user's channel 30, such as the username of the first user, the multimedia content name of the currently playing multimedia content, or other like options. The system 10 may also provide a follow option 38 and/or a like option 40. Of course, other similar social media options may also be provided. The follow option 38 may create and send notifications to the second user regarding the first user's activity. Further, the "follow" option 38 may continuously allow the second user access to whatever the first user had on the first user's channel, as long as the second user can independently access the content on the first user's channel through his or her own subscription/access to a multimedia service. The like option 40 may notify the first user that another user has liked his or her multimedia content selection.

The second user may view a profile relating to the first user by selecting the first user's username. The first user's profile may be created by the first user at his or her convenience and may include without limitation, name, age, location, interests, or other like profile information.

The second user may request access or otherwise join the first user's channel 30 by utilizing a "join username" option 42. The "join username" option 42 may connect or otherwise link the second user to the first user's channel 30, as shown in FIG. 7B. The system 10 may search the second user's multimedia service that the second user has a subscription to or otherwise has access to for the multimedia content described by the information on the first user's channel 30. If the system 10 locates the multimedia content on the first user's channel 30 on the second user's multimedia service, the system 10 may start playing the multimedia content on the second user's device at the point in time in which the multimedia content is currently playing on the first user's device, such that the first user and the second user are simultaneously enjoying the same multimedia content at the same time, albeit independently through each's own subscription/access to a multimedia service. If the system 10 cannot locate the multimedia content on the first user's channel 30 on the second user's multimedia service, the system 10 may look in alternate multimedia services the second user has a subscription to or otherwise has access to, may offer a license purchase option to the second user for the multimedia content, may deny the second user access to the multimedia content on the first user's channel 30, or any combination thereof. Of course, the second user may reobtain access to the first user's channel 30 when the system 10 can locate the multimedia content on the first user's channel 30 on a multimedia service the second user has a subscription to or otherwise has access to.

In one embodiment, the system 10 may look at all the multimedia contents in the first user's play queue or playlists when the second user attempts to access the first user's channel 30. In this embodiment, the system 10 may discover whether the second user has access to each multimedia content within the first user's play queue or playlist before the multimedia contents are currently displayed on the first user's channel.

As shown in FIG. 7B, the second user may have a plurality of options 44 such as adding the multimedia content to a playlist on the multimedia service the second user subscribes to using a star icon and/or may display that the second user likes the multimedia content on his or her social media website using a thumbs up icon. The second user may also have access to the first user's play queue and play history, in which the second user may sort through, like, share the name of the multimedia played by the first user, add to playlist, and use other similar options known to those skilled in the art and/or described herein.

The present invention may be implemented as an application for mobile devices as well as a computer program. A user may be able to use a touch screen to make selections and utilize options as described herein. The present invention may involve at least a computer processor, a network connector, an audio transducer, and a visual transducer such that multimedia contents such as videos, songs, or the like may be transferred to the system over the internet, displayed on a device, played there through, and/or streamed to other users of the system.

Specifically, each device may have an audio transducer such as speaker and a visual transducer such as a display. The display may also be a touch screen that allows a user to physically interact and make selections according to the present invention. Of course, each device may also include any other interactive device known now or will be known in the future that allows a user to interact with and enjoy multimedia content. As described by the present disclosure, the present invention may provide a plurality of users the ability synchronize multimedia across numerous devices. Specifically, a first user may select a first multimedia content from a first multimedia service and begin to produce audio through a first device's speaker. The first device may simultaneously display information and/or video related to the produced sound on a first device's display.

A second user may discover the information, audio, and/or video relating to the first multimedia content that the first user is playing on a second device utilizing the present invention. Further, the second user may request or otherwise obtain access to the first multimedia content that the first user is playing by independently accessing the first multimedia content through the first multimedia service or through an alternate multimedia service. Additionally, the present invention may synchronize the first multimedia content on the second device with the first multimedia content on the first device such that the audio being produced by the first device's speaker and/or the video being produced by the first device's display is synced with audio being produced by a second device's speaker and/or video being produced by a second device's display.

Even more specifically, the audio and/or video produced by the first device may be synchronized with the audio and/or video produced by the second device so long as the second user accesses a channel dedicated to the first user. In this regard, the second user may share in the first user's audio and/or visual experience. The first user may be in total control of what the second user experiences while the second user is accessing the first user's channel, or the first user may himself or herself be accessing a third user's experience, as described herein. In the latter example, the second user may share in the third user's experience as long as the first user is accessing the third user's channel. However, even though the second user may indirectly be accessing the third user's experience, the first user may decide to suspend access to the third user's experience at any time and the second user, thus, would also be suspended from access to the third user's experience, because the second user is only directly accessing the first user's experience, and thus indirectly accessing the third user's experience. Of course, the second user may decide to directly access any other user's channel, and thus take control of his or her experience, at any time.

What this means is that a second user (or an infinite number of independent users) may share in a first user's experience without having to be near the first user. Specifically, each user may be listening and/or viewing synchronized identical content retrieved and matched across one or more multimedia services, chosen by one of the users, at the exact same point in time independent of each other's location. The present invention provides an independent, peer-to-peer communal experience that has been previously unaccomplished.

The multimedia service may be a paid service, an advertisement paid service, or a free service. The multimedia service may be Spotify, SoundCloud, Youtube, Youtube Music Key, Xbox music, Pandora, iTunes, Google Play, Amazon, Rhapsody, Beats, Vevo, Vimeo, Hulu, Netflix, WatchESPN, HBOGo, Twitch.tv, or any other similar multimedia service known to those skilled in the art.

In one embodiment, if a second user is using an advertisement service and is accessing a first user's channel, wherein the first user is using an advertisement free service, a time displacement may occur. Specifically, when the second user is listening and/or viewing an advertisement, a first multimedia content may start, end, or otherwise continue playing on a first user's device without advertisements. Therefore, when the advertisement ends for the second user, the second user may synchronize to the current time point in the first multimedia content that the first user is at. In this embodiment, the second user may miss portions of the first multimedia content.

In another embodiment, if the second user is using an advertisement free service and is accessing a first user's channel, wherein the first user is using an advertisement service, a time displacement may occur. Specifically, when the first user is listening and/or viewing an advertisement, a first multimedia content may start, end, or otherwise continue playing on the second user's device without advertisements. Therefore, when the advertisement ends for the first user, the first user may synchronize to the current time point in the first multimedia content that the second user is at. In this embodiment, the first user may miss portions of the first multimedia content.

In another embodiment, if the second user is using an advertisement free service and is accessing a first user's channel, wherein the first user is using an advertisement service, a time displacement may occur. Specifically, when the first user is listening and/or viewing an advertisement, nothing may be playing on the second user's device. Alternatively, the second user may be redirected to automatically access alternative recommended content temporarily, the second user may be provided suggestions for synchronizing (either permanently or temporarily) with alternate advertisement free users enjoying the same multimedia content, the second user may listen to and/or view the advertisement that the first user is listening to and/or viewing, the second user may be given the choice to opt in or opt out of listening to and/or viewing the advertisement that the first user is listening to and/or viewing, or the like. When the advertisement ends for the first user, the second user may synchronize to the starting point in the first multimedia content that the first user is also at. In this embodiment, the second user may have to wait to begin the first multimedia content.

In an alternate embodiment, each device and each user channel may be equipped with geo-location tags and/or devices. The geo-location tags and/or devices may be utilized in order to discover local user channels in the same location or in close vicinity. In one example, a first user may be in a coffee shop and may enjoy the coffee shop's audio experience. Thereafter, the first user may discover the coffee shop's user channel on the present invention because the first user's geo-location is the same or in close vicinity to the geo-location of the coffee shop. The first user may request or otherwise obtain access to the coffee shop's user channel and independently access the multimedia being produced by the coffee shop through the first user's multimedia service. The first user may be able to then leave the coffee shop, while still being able to enjoy the audio experience being produced within the coffee shop. The first user may continue to share the experience with the coffee shop for as long as the first user continues to access the coffee shop's channel. Of course, any store, venue, event, business, house, party, or other place producing multimedia content experiences may replace the coffee shop in the previous example without departing from the scope of the present invention.

A first user of the present invention may be able to provide other users with access to original content created by the first user that is uploaded to the first user's channel ("User-Generated Content"). For example, a first user may create, record, and upload any User-Generated Content, including audio, video, or other multimedia content directly created and recorded by the user from any device, such that other users will be able to sync up with the first user's channel and access and stream that User-Generated Content in real-time when the first user is experiencing such User-Generated Content. The User-Generated Content may be recorded, uploaded and live streamed through the methods and systems of the present invention. Specifically, a recording option, uploading option, and a streaming option may be provided to allow the first user of the present invention to record, upload, live stream, or otherwise provide other users of the system with access to such User-Generated Content through the first user's own channel.

The peer-to-peer communal experience described in detail above applies to content streamed by third party hosted multimedia services and User-Generated Content live streamed by the system, which may be hosted on servers associated with the present invention. Specifically, a second user may join a live streamed User-Generated Content upload of a first user, and the second user may therefore share in the first user's experience. Other users may then similarly access the User-Generated Content being accessed by the second user's channel to share in the second user's experience.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

We claim:

1. A method for retrieving and syncing multimedia digital content among multiple multimedia devices by multiple users, the method comprising the steps of:
   providing a first multimedia device;
   providing a first network-based and subscription-based multimedia service that a first user has access to, wherein the first network-based and subscription-based multimedia service is accessible on the first multimedia device via a first subscription to the first multimedia service;
   selecting a first multimedia content from the first network-based multimedia service by the first user on the first multimedia device;
   creating a first channel on the first multimedia device to display information relating to at least the first multimedia content;
   transferring the first multimedia content from the first network-based multimedia service to the first multimedia device;
   playing at least the first multimedia content on the first multimedia device, wherein the first channel displays information relating to at least the first multimedia content;
   providing access to the first channel to a second user using a second multimedia device, wherein the first network-based and subscription-based multimedia service is accessible by the second multimedia device via a second subscription to the first multimedia service;
   verifying that the second user independently has access, via the second subscription to the first multimedia service, to the first multimedia content from the first network-based and subscription-based multimedia service;
   transferring the first multimedia content from the first network-based multimedia service to the second multimedia device;
   recording a time point in the first multimedia content on the first multimedia device after the second user's independent access to the first multimedia content from the first multimedia service is verified;
   synchronizing the first multimedia content on the second multimedia device with the time point in the first multimedia content on the first multimedia device; and
   playing the first multimedia content on the second multimedia device.

2. The method of claim 1 wherein the first multimedia content is selected from the group consisting of music, video, audio, live event, and any combination thereof.

3. The method of claim 1 further comprising the step of:
   providing social network functions selected from the group consisting of messaging, liking, promoting, following, befriending, commenting, chatting, audio messaging, video messaging, audio voice-overs, video voice-overs, and any combination thereof.

4. The method of claim 1 further comprising the step of:
   creating a playlist within the first multimedia service including at least the first multimedia content.

5. The method of claim 1 further comprising the steps of:
selecting a second multimedia content from the first multimedia service by the second user; and
creating a second channel on the second multimedia device to display information relating to at least the second multimedia content.

6. The method of claim 5 further comprising the steps of:
providing access to the second channel to a third user using a third multimedia device, wherein the first multimedia service is accessible by the third multimedia device;
verifying that the third user independently has access to the second multimedia content from the first multimedia service; and
accessing at least the second multimedia content by the third multimedia device.

7. A method for simultaneously syncing content on multimedia devices amongst multiple users, the method comprising the steps of:
providing a first multimedia device,
providing a first network-based and subscription-based multimedia service that a first user has access to, wherein the first network-based and subscription-based multimedia service is accessible on the first multimedia device via a first subscription;
selecting a first multimedia content from the first network-based and subscription-based multimedia service by the first user on the first multimedia device;
creating a first channel on the first multimedia device to display information relating to at least the first multimedia content;
transferring the first multimedia content from the first network-based and subscription-based multimedia service to the first multimedia device;
playing the first multimedia content on the first multimedia device, wherein the first channel displays information relating to at least the first multimedia content;
providing access to the first channel to a second user using a second multimedia device, wherein a second network-based and subscription-based multimedia service is accessible on the second multimedia device via a second subscription;
verifying that the second user independently has access to the first multimedia content from the second network-based and subscription-based multimedia service;
transferring the first multimedia content from the second network-based and subscription-based multimedia service to the second multimedia device;
recording a time point in the first multimedia content on the first multimedia device after the second user's independent access to the first multimedia content from the second multimedia service is verified; and
synchronizing the first multimedia content on the second multimedia device with the time point in the first multimedia content on the first multimedia device; and
playing the first multimedia content on the second multimedia device.

8. The method of claim 7 wherein the first multimedia content is selected from the group consisting of music, video, audio, live event, and any combination thereof.

9. The method of claim 7 further comprising the step of:
providing social network functions selected from the group consisting of messaging, liking, promoting, commenting, chatting, audio messaging, video messaging, audio voice-overs, video voice-overs, and any combination thereof.

10. The method of claim 7 further comprising the steps of:
selecting a second multimedia content from the second multimedia service by the second user; and
creating a second channel on the second multimedia device to display information relating to at least the second multimedia content.

11. The method of claim 10 further comprising the steps of:
providing access to the second channel to a third user using a third multimedia device, wherein the second multimedia service is accessible on the third multimedia device;
verifying that the third user independently has access to the second multimedia content from the second multimedia service; and
playing at least the second multimedia content on the third multimedia device.

12. The method of claim 7 further comprising the step of:
creating a playlist within the second multimedia service including at least the first multimedia content.

13. A system for simultaneously syncing content amongst multiple users, the system comprising:
a first multimedia device and a second multimedia device interconnected via a network;
a first network-based and subscription-based multimedia service that a first user has access to, wherein the first network-based and subscription-based multimedia service is accessible by the first user on the first multimedia device via a first subscription;
a first channel on the first multimedia device accessible by at least a second user using the second multimedia device, wherein the first channel provides information regarding a first multimedia content selected by the first user from the first network-based and subscription-based multimedia service on the first multimedia device;
a content verifier that determines whether the second user has independent access to the first multimedia content on a subscription-based service selected from the group consisting of the first network-based and subscription-based multimedia service and a second network-based and subscription-based multimedia service when the second user accesses the first channel; and a time synchronizer that initializes the first multimedia content on the second multimedia device at a time point the first multimedia content is being played on the first multimedia device, wherein the time synchronizer records a time point in the first multimedia content on the first multimedia device after the second user's independent access to the first multimedia content is verified and further wherein the time synchronizer synchronizes the first multimedia on the second multimedia device content with the time point in the first multimedia content on the first multimedia device.

14. The system of claim 13 wherein the first multimedia content is selected from the group consisting of music, video, audio, live event, and any combination thereof.

15. The system of claim 13 further comprising a second channel on the second multimedia device accessible over the network by at least the first user using the first multimedia device, wherein the second channel provides information regarding a second multimedia content selected by the second user from the first multimedia service on the second multimedia device.

16. The system of claim 13 further comprising a second channel on the second multimedia device accessible over the network by at least the first user using the first multimedia device, wherein the second channel provides information regarding a second multimedia content selected by the second user from a second multimedia service on the second multimedia device.

\* \* \* \* \*